(12) United States Patent
Stamp et al.

(10) Patent No.: US 10,872,471 B1
(45) Date of Patent: Dec. 22, 2020

(54) AUGMENTED REALITY STORY-TELLING SYSTEM

(71) Applicants: Bryan Stamp, Bradenton, FL (US);
Joseph Berceau, Lakewood Ranch, FL (US)

(72) Inventors: Bryan Stamp, Bradenton, FL (US);
Joseph Berceau, Lakewood Ranch, FL (US)

( * ) Notice: Subject to any disclaimer, the term of this patent is extended or adjusted under 35 U.S.C. 154(b) by 0 days.

(21) Appl. No.: 16/510,337

(22) Filed: Jul. 12, 2019

Related U.S. Application Data

(60) Provisional application No. 62/731,318, filed on Sep. 14, 2018.

(51) Int. Cl.
| | | |
|---|---|---|
| *G06F 3/0483* | (2013.01) |
| *G06T 19/00* | (2011.01) |
| *G06T 15/20* | (2011.01) |
| *G06T 7/20* | (2017.01) |
| *G06T 5/00* | (2006.01) |
| *G06F 3/16* | (2006.01) |
| *G06F 3/0484* | (2013.01) |
| *G06F 3/0481* | (2013.01) |
| *G06T 13/20* | (2011.01) |
| *G09B 19/00* | (2006.01) |
| *G09B 7/00* | (2006.01) |

(52) U.S. Cl.
CPC .......... *G06T 19/006* (2013.01); *G06F 3/0483* (2013.01); *G06F 3/04815* (2013.01); *G06F 3/04847* (2013.01); *G06F 3/167* (2013.01); *G06T 5/002* (2013.01); *G06T 7/20* (2013.01); *G06T 13/20* (2013.01); *G06T 15/20* (2013.01); *G09B 7/00* (2013.01); *G09B 19/00* (2013.01); *G06T 2200/24* (2013.01); *G06T 2219/024* (2013.01)

(58) Field of Classification Search
None
See application file for complete search history.

(56) References Cited

U.S. PATENT DOCUMENTS

| | | | |
|---|---|---|---|
| 9,317,746 B2* | 4/2016 | Shoemaker | G06K 9/00355 |
| 2014/0210710 A1* | 7/2014 | Shin | G06F 3/011 |
| | | | 345/156 |
| 2015/0040074 A1* | 2/2015 | Hofmann | G06F 3/04815 |
| | | | 715/852 |

* cited by examiner

*Primary Examiner* — Said Broome
(74) *Attorney, Agent, or Firm* — John Rizvi; John Rizvi, P.A.—The Patent Professor®

(57) ABSTRACT

An augmented reality story-telling system is disclosed. The system is intended to work with mobile computing devices, and utilizes proprietary software to display augmented-reality enhanced stories in a physical environment. Contemplated for use in children's books and educational materials, the system is designed to enhance user interaction with the information in the stories so as to improve user literacy and vocabulary. The system may be made available in a personal or a classroom edition, and either format may include features that both teach and quiz a user on the story and the language used. The system may also incorporate analytics and metrics to assess and track user progress over time. Stories for the system may be stored locally on the user's device or may be downloaded from a central database through the proprietary software.

1 Claim, 2 Drawing Sheets

AUGMENTED REALITY STORY-TELLING SYSTEM

CROSS-REFERENCE TO RELATED APPLICATION

This application claims the benefit of U.S. Provisional Patent Application Ser. No. 62/731,318, filed Sep. 14, 2018, which is incorporated herein in its entirety.

FIELD OF THE INVENTION

The present invention relates generally to computing systems, and more particularly, to an augmented reality story-telling system that improves computer functionality.

BACKGROUND OF THE INVENTION

Augmented reality is an interactive experience of a real-world environment whereby the objects that reside in the real world are supplemented by computer-generated perceptual information. Such systems may implement multiple modalities including visual, audible, haptic, somatosensory, and olfactory. The overlaid sensory information can be constructive, meaning that information is added to the natural environment, or destructive, meaning that the natural environment is masked, and is interwoven into the physical world such that it is perceived as an aspect of the real environment. The primary value of such systems is the application of digital information into a person's perception of the real world so as to create an impression that the digital information is a part of the natural environment.

The technology used to facilitate augmented reality includes, generally, processors, displays, sensors, and input devices, the combinations of which are presently available in modern mobile computing devices and smartphones. Certain augmented reality systems may implement cameras and microelectromechanical systems such as accelerometers, global positioning systems (GPS), and solid state compasses to help orient the device within the environment. Augmented reality systems often also include user interfaces such as head-mounted displays (HMD), appropriately-equipped eyeglasses, and heads-up displays (HUD).

In the educational setting augmented reality is used to enhance modern curriculums, where text, graphics, audio, and video may be superimposed into a student's real-time environment. Textbooks, flashcards, and other physical reading materials may contain embedded markers or triggers that can be scanned by an augmented reality device to superimpose additional information related to the material. Such educational texts, and especially children's books, still rely heavily on the classic print format to present information. A modern alternative to the print format is the electronic book, or e-book, which is a digitally formatted book that may be read on mobile computing devices and smartphones. E-books, like print books, may be presented in a text-only format, a text with images format, or a picture format with accompanying text. Such e-books may also incorporate features such as audible narrating or picture and text interaction, though such interactivity is very basic compared to the software and applications with which children are modernly occupied.

The lack of enhanced interactivity provided by augmented reality devices, especially for modern, technologically-enabled children, is an identified detriment to their engagement with the reading and learning process. Even the children's publishing industry reports that a new format for children's books is long overdue, and the ability for children to see a story play itself out interactively would provide a significant boost to a book's ability to engage, excite, and educate a child. While some limited augmented reality is presently available in association with physical print media, no system exists that associates augmented reality with electronic print media to present a story overlaid in the physical environment.

Therefore, computer technology needs, and will benefit from, an augmented reality story-telling system that implements augmented reality technologies to overlay the stories in e-books onto the physical environment to enhance a reader's engagement with the storybook media.

SUMMARY OF THE INVENTION

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

According to embodiments or examples of the present disclosure, an augmented reality story-telling system is disclosed.

In one aspect, the augmented reality story-telling system may be implemented on a mobile computing device.

In another aspect, the augmented reality story-telling system may comprise a central database.

In another aspect, the augmented reality story-telling system may comprise a plurality of augmented reality-enabled stories.

In another aspect, the augmented reality story-telling system may comprise a user progress tracker.

In another aspect, the augmented reality story-telling system may comprise literacy development tools.

In another aspect, the augmented reality story-telling system may comprise user data analytics tools.

In another aspect, the augmented reality story-telling system may comprise a plurality of user personalization settings.

In another aspect, the augmented reality story-telling system may comprise a classroom edition.

Disclosed as another example is an augmented reality story-telling method, the method comprising:

using a logic machine and a camera, automatically determining a surface appropriate for displaying one or more augmented reality objects that are set to appear to be resting on the surface, by tracking three dimensional geometries in a field of view of the camera using the logic machine;

the one or more augmented reality objects including a three dimensional representation of a story book;

using the logic machine, adjusting a displayed perspective angle of the one or more augmented reality objects in response to a changed perspective angle of the camera by tracking the three dimensional geometries in the field of view of the camera, such that a changed perspective angle of the camera relative to the determined surface is reflected on a changed perspective angle of the one or more augmented reality objects, to give the effect that the augmented reality objects are viewable from various perspectives of the camera while the one or more augmented reality objects appear to rest on the surface;

displaying a graphical user interface; and receiving an input via the graphical user interface to modify displayed content of the one or more augmented reality objects, and automatically modifying the displayed content of the one or more augmented reality objects according to the input, wherein the logic machine is used to track subsequent inputs to the graphical user interface to determine a correct modification to the displayed content of the one or more augmented reality objects in response to the input.

In another aspect, the method further comprises:

using a logic machine, prompting a user with one or more prompts to enter an input based on content of the one or more augmented reality objects, and receiving an input through the graphical user interface based on the one or more prompts; and using the logic machine, subsequent and based on the one or more prompts, tracking the user input and producing a report of the user input, and displaying the report though the graphical user interface, the report indicating at least a result of one or more prompts and their subsequent associated user inputs.

In another aspect, the method further comprises:

using one or more logic machines, synchronizing the content of the one or more augmented reality objects between a plurality of user devices such that the content is displayed to multiple users in synchrony, while each user of each of the plurality of devices is able to view the synchronized content from different angles, allowing progression of the content to be synchronized while the displayed perspective of the content is non-synchronized.

In another aspect, the method further comprises:

using a logic machine, displaying text that accompanies the content of the one or more augmented reality objects, the logic machine automatically determining the correct text that is to accompany progression of the content by tracking a progression timeline of the content.

In another aspect, the method further comprises:

using a logic machine, displaying text that accompanies the content of the one or more augmented reality objects, the logic machine automatically determining the correct text that is to accompany progression of the content by tracking a progression timeline of the content; and using a logic machine, by first tracking and determining a position of the text, blurring a background portion behind the text to visually distinguish the text over the visual content behind the text.

In another aspect, the method further comprises:

using a logic machine and audio playback hardware, playing an audio narration that accompanies the content of the one or more augmented reality objects, the logic machine automatically determining the correct audio narration that is to accompany progression of the content by tracking a progression timeline of the content.

In another aspect, the method further comprises:

using a logic machine and audio playback hardware, playing audio narration that accompanies the content of the one or more augmented reality objects; and based on the audio narration, displaying a visual cue on text narration to indicate narrative progress on the text narration with respect to the content of the one or more augmented reality objects, the logic machine automatically determining the correct text and audio narration that is to accompany progression of the content by tracking a progression timeline of the content.

In another aspect, the method further comprises:

receiving through the graphical user interface, a user input that creates a definition of content of the one or more augmented reality objects, such that the definition is referenced throughout automatic progression of the content of the one or more augmented reality objects, providing a way to customize the content, the logic machine automatically determining the user input created definitions that are to accompany progression of the content by tracking a progression timeline of the content in accordance with saved custom definition data generated by the user input.

In another aspect, the method further comprises:

using a hardware microphone, receiving a voice input; and using a logic machine, modifying the content of the one or more augmented reality objects by tracking the voice input received through the hardware microphone.

In another aspect, the method further comprises:

using a hardware microphone, receiving a voice input; and using a logic machine, controlling the progression of the one or more augmented reality objects by tracking the voice input received through the hardware microphone.

In another aspect, the one or more augmented reality objects include an animated storybook that has pages that flip in response to user inputs through the graphical user interface, the logic machine tracking the user inputs to determine a specific page to flip to.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
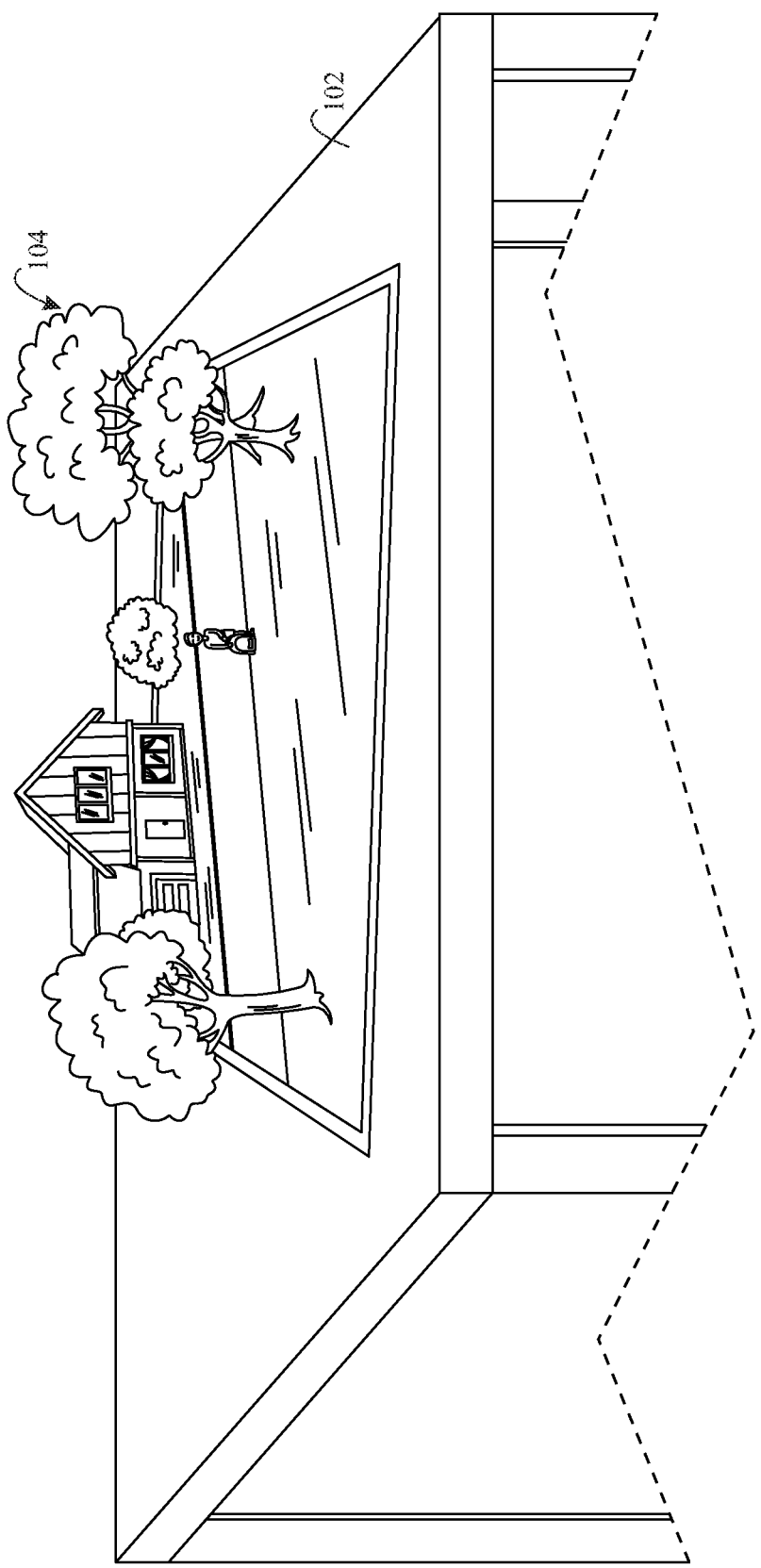
FIG. 1 illustrates an exemplary user interface of an augmented reality story-telling system, in accordance with aspects of the present disclosure.

The illustration of FIG. 1 illustrates an exemplary user interface of an augmented reality story-telling system. The present system contemplates the use of mobile computing devices, such as smart tablets or smartphones, to display appropriately-encoded electronic stories on their screens using augmented reality enhancements. The system comprises, generally, a proprietary software application for displaying a user interface incorporating a library of stories from which to choose, a video player, and a plurality of personalization options. In a second embodiment the proprietary software may further incorporate a plurality of classroom-specific settings and options for use in the educational setting. In various embodiments the system may further incorporate a central database wherein the wireless capability of the mobile computing device may access an online library of stories for streaming or download.

The proprietary software itself may be downloaded and installed onto a mobile computing device, and may allow a user to register a user account and select from a plurality of personalization settings. Within the user interface the user may further select from options for browsing, downloading, or installing stories on the device's local storage or from the system's central database. The user interface may further incorporate a story player to display such stories once they have been selected for playback, and the story player may incorporate any appropriate playback controls for ease of use. In alternative embodiments the user interface may further incorporate tracking, analysis, and analytics tools for assessing a user's literacy and vocabulary skills or for assisting a user with improving such skills. Contemplated methods of such teaching include the use of word readers or pronunciation tools, as well as the use of individualized quizzes and assessments.

To implement the system, the proprietary software may gain access to any appropriate hardware built into the mobile computing device, though especially the camera and the screen display. The system may use the screen display to show the environment visible through the camera and overlay the selected story onto such environment. The camera itself may incorporate facial or object-recognition technology, which the software may access, so that the software may recognize objects within the environment and accurately display the story thereon. By way of example, the camera may recognize a flat surface, such as a table top 102 (FIG. 1), and may display an area 104 on which the story is told on that flat surface as seen through the display screen. Such an area 104 may be known as a "storybook" area, and is digitally displayed as an augmented reality overlay (e.g. three-dimensional animation) over the table top 102. The proprietary software may incorporate two-dimensional or three-dimensional animations, as appropriate or as preferred, and may utilize various surfaces visible through the camera to display the augmented reality features. The user may also select a surface or an area visible through the camera and displayed on the screen upon which to orient the augmented reality features.

The stories to be utilized by the system may be of a proprietary format, though are generally electronic stories with augmented reality enhancements built in. Such enhancements may include a plurality of interactive and customizable features that may be selectively enabled or modified by the user. By way of example, a story may begin playback and the storybook may open to the first page of an augmented reality book. A chapter or section of the story may then be played in the storybook area and, once completed, a plurality of questions may be displayed on the screen for the user to answer. Additionally, the characters in the story may interact with the user during the course of the story by asking questions to the user directly or giving teaching points at various stages in the story. It is contemplated that the proprietary software may also access the microphone of the mobile computing device so that the user may vocally respond to questions and interact with the story verbally.

The various stories may also comprise a plurality of story customization features. A user may, for example, change the names of the various characters in the story so that the user may feel a personal connection with the playback. The proprietary software may also allow the user to record samples or exemplars of their own voice so that the narrative playback of a story is the user's voice. The user may also be able to record and display an avatar of themselves to overlay as a character in the story so that the user feels as if they are a part of the storyline.

The teaching features of the proprietary software may be implemented both for individual use and for group-learning or classroom use. Such features may include, especially, a post-completion literacy quiz that may be specific to each story and may be displayed once a chapter or the entire story has concluded. Such a quiz may prompt the user to take targeted literacy, fluency, and comprehension assessments related to the story or to language in general, and analytics or metrics may be recorded under the user's profile that may be later analyzed to show evaluation and progress reports.

The group-learning or classroom features may further incorporate the ability for teachers to customize post-completion quiz questions related to the story or may even allow multiple mobile computing devices (presenting the augmented reality visuals) to synchronize with the teacher's device so that the teacher may guide the playback of the story while students follow along. In such a setup each student may still interact with their individual display while the teacher guides the pace of the story itself. Such group or classroom features may further supply analytics or metrics for the individual users to the teacher's device, whether as a summary or in real-time.

Various embodiments of the system may display the text of the story along with the augmented reality playback of the story. In such embodiments the proprietary software may implement a blur panel, which is an area on the screen that is transparent, though which blurs the details and brightness of the background so as to clearly display text. Such a blur panel may further incorporate text scrolling or swiping abilities, and may comprise any appropriate means for indicating the current position of the text relative to the full body of the text. The blur panel may also incorporate arrows or other indications that the text may be swiped to advance or rewind the displayed text. Vocabulary words, whether selected by the programmer, the software, or the user, may be highlighted within the text so as to draw the user's attention, and may be interacted with to trigger various features of the software such as displaying definitions or playing an audio sample of the word.

The proprietary software may further comprise a narration feature that may be activated or deactivated, and which may read the story to the user along with the text display. The text may transform along with the pacing of the narration, and may either highlight the current word being read, may change the color of text that has been read, or may change by any other appropriate means. The user may also interact with the story by turning the page on the storybook area to advance the story to the next chapter or section. The page turning may be displayed as would appear to occur with a physical book or by any other appropriate means.

Figure 2:
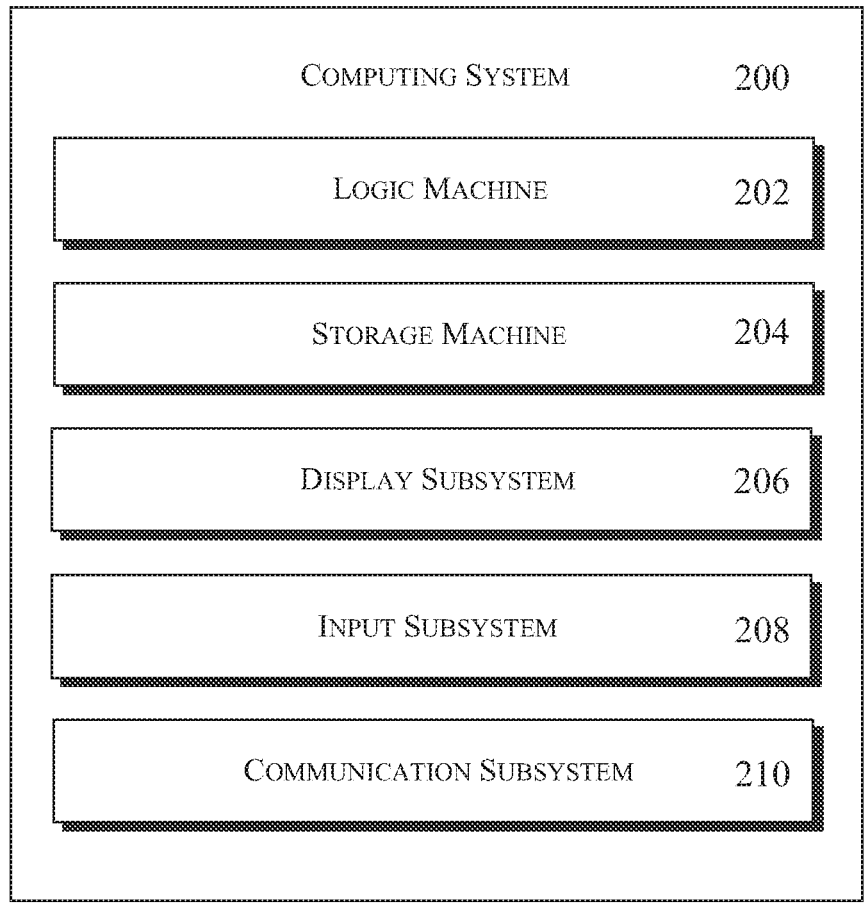
FIG. 2 schematically presents a computing system configured to carry out and actualize methods and tasks described herein, in accordance with aspects of the present disclosure.

The illustration of FIG. 2 schematically presents a computing system that may represent an embodiment of the present invention. In some embodiments the method is executed on a computing system such as computing system 200 of FIG. 2. For example, storage machine 204 may hold instructions executable by logic machine 202 to provide the method to users. Display subsystem 206 may display the various elements of the method to participants. For example, display subsystem 206, storage machine 204, and logic machine 202 may be integrated such that the method may be executed while being displayed on a display screen. The input subsystem 208 may receive user input from participants to indicate the various choices or user inputs described above. The described method may be executed, provided or implemented to a user on one or more computing devices via a computer-program product such as via an application programming interface (API). FIG. 2 schematically shows a non-limiting exemplary embodiment of a computing system 200 that can enact the method described above. Computing system 200 may be any appropriate computing device such as a personal computer, tablet computing device, gaming device or console, mobile computing device, etc. Computing system 200 includes a logic machine 202 and a storage machine 204. Computing system 200 may include a display subsystem 206, input subsystem 208, and communication subsystem 210. Logic machine 202 may execute machine-readable instructions via one or more physical devices. For example, the logic machine 202 may be configured to execute instructions to perform tasks for a computer program. The logic machine may include one or more processors to execute machine-readable instructions. Storage machine 204 includes one or more physical devices configured to hold or store instructions executable by the logic machine to implement the method. When such methods and processes are implemented, the state of storage machine 204 may be changed to hold different data. For example, storage machine 204 may include memory devices such as various hard disk drives or CD or DVD devices. Display subsystem 206 may visually present data stored on storage machine 204. For example, display subsystem 206 may visually present data to form a graphical user interface (GUI). Input subsystem 208 may be configured to connect and receive input from devices such as a mouse, keyboard, or gaming controller. Communication subsystem 210 may be configured to enable system 200 to communicate with other computing devices. Communication subsystem 210 may include wired and/or wireless communication devices to facilitate networked communication.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An augmented reality story-telling method, the method comprising:
   the use of mobile computing devices to display appropriately-encoded electronic stories on their screens using augmented reality enhancements;
   displaying a user interface incorporating a library of stories from which to choose, a video player, and a plurality of personalization options;
   a plurality of classroom-specific settings and options for use in an educational setting;
   a central database such that a wireless capability of a mobile computing device can access an online library of stories for streaming or download;
   within the user interface the selecting from options for browsing, downloading, or installing stories on the device's local storage or from the system's central database;
   playing a story using a story player to display such stories once they have been selected for playback, the story player incorporating any appropriate playback controls for ease of use;
   the user interface further incorporating tracking, analysis, and analytics tools for assessing a user's literacy and vocabulary skills or for assisting a user with improving such skills;
   methods of such teaching including the use of word readers or pronunciation tools, as well as the use of individualized quizzes and assessments;
   running a software application for gaining access to a camera and screen display, and using the screen display to show an environment visible through the camera and overlay a selected story onto such environment;
   the camera itself incorporating facial or object-recognition technology, which a software on the device accesses, so that the software recognizes objects within the environment and accurately displays a story thereon;
   the camera recognizing a flat surface, such as a table top, and displaying an area on which the story is told on that flat surface as seen through the display screen, the area defined as a storybook area;
   the storybook area being digitally displayed as an augmented reality overlay or three dimensional animation over the table top;
   incorporating two-dimensional or three-dimensional animations, as appropriate to the story, utilizing various surfaces visible through the camera to display the augmented reality features;
   selecting a surface or an area visible through the camera and displayed on the screen upon which to orient the augmented reality features;
   the stories being electronic stories with augmented reality enhancements built in, the enhancements including a plurality of interactive and customizable features that are selectively enabled or modified by the user;
   beginning playback of a story and opening the augmented reality storybook to the first page;
   playing a chapter or section of the story in the storybook area and, once completed, displaying a plurality of questions on the screen for the user to answer;
   interacting the characters in the story with a user during the course of the story by asking questions to the user directly or giving teaching points at various stages in the story;
   accessing a microphone of the mobile computing device so that the user can vocally respond to questions and interact with the story verbally;
   the various stories comprising a plurality of story customization features
   allowing a user to change the names of the various characters in the story so that the user feels a personal connection with the playback;

allowing the user to record samples or exemplars of their own voice so that the narrative playback of a story is the user's voice;

allowing the user to record and display an avatar of themselves to overlay as a character in the story so that the user feels as if they are a part of the storyline;

the teaching features of the software being implemented both for individual use and for group-learning or classroom use, the features including a post-completion literacy quiz that is specific to each story and displayed once a chapter or the entire story has concluded, such a quiz prompting the user to take targeted literacy, fluency, and comprehension assessments related to the story or to language in general, and analytics or metrics being recorded under the user's profile that is later analyzed to show evaluation and progress reports;

group-learning or classroom features further incorporating the ability for teachers to customize post-completion quiz questions related to the story or allowing multiple mobile computing devices that each present the augmented reality visuals to synchronize with the teacher's device so that the teacher guides the playback of the story while students follow along;

each student interacting with their individual display while the teacher guides the pace of the story itself;

such group or classroom features further supplying analytics or metrics for the individual users to the teacher's device, whether as a summary or in real-time;

displaying the text of the story along with the augmented reality playback of the story;

implementing a blur panel, which is an area on the screen that is transparent, though which blurs the details and brightness of the background so as to clearly display text, the blur panel incorporating text scrolling or swiping abilities, and comprising any appropriate method for indicating the current position of the text relative to the full body of the text, the blur panel incorporating arrows or other indications that allows to advance or rewind the displayed text;

vocabulary words, whether selected by the programmer, the software, or the user, being highlighted within the text so as to draw the user's attention, and being interacted with to trigger displaying definitions or playing an audio sample of the word;

a narration feature being activated or deactivated, and which reads the story to the user along with the text display, the text transforming along with the pacing of the narration, and highlighting the current word being read, changing the color of text that has been read, or changing the visual appearance of the text; and allowing the user to interact with the story by turning the page on the storybook area to advance the story to the next chapter or section, the page turning being displayed as would appear to occur with a physical book.

* * * * *